United States Patent Office 2,930,819
Patented Mar. 29, 1960

2,930,819
ALKYLATION OF BENZENE

Robert S. Aries, Stamford, Conn.

No Drawing. Application September 16, 1957
Serial No. 683,973

8 Claims. (Cl. 260—671)

This invention relates to a novel method for the alkylation of benzene. More particularly, the invention is concerned with a new method for the production of cumene by propylation of benzene in the presence of an activated clay type catalyst.

Alkylated benzenes are valuable antiknock and antidetonating agents for blending with aviation gasoline and motor fuels. In refinery practice, benzene or aromatic fractions may be alkylated catalytically with olefin feed stocks to form both mono- and polyalkyl derivatives.

Cumene or isopropylbenzene also finds important use in the production of synthetic phenol by the cumene hydroperoxide process, and as an intermediate in the manufacture of other organic chemicals.

Cumene or isopropylbenzene is usually manufactured by alkylating benzene with propylene, or propylene-containing gases in accordance with the equation:

$$C_6H_6 + C_3H_6 \rightarrow C_6H_5 \cdot C_3H_7$$

This alkylation is an example of a general reaction using various olefins to alkylate benzene. For example, the alkylation of benzene with ethylene forms ethylbenzene similarly to the propylation of benzene. The reaction is limited commercially only by the fact that alkylbenzenes are not in great commercial demand except for isopropylbenzene and ethylbenzene, but is equally applicable to other alkylbenzenes, such as butyl and amyl benzenes.

The catalysts commonly used for the purpose of alkylating benzene by propylene to produce cumene include so-called solid phosphoric acid, sulfuric acid, hydrofluoric acid, and anhydrous aluminum chloride. Of these, the aluminum chloride is generally considered most useful.

However, aluminum chloride has certain disadvantages as a catalyst, including the lack of selectivity towards other olefin alkylating agents. For example, if the propylene contains some ethylene, ethylbenzene is simultaneously formed with the formation of cumene which it then contaminates and from which it must be separated. Furthermore aluminum chloride has the disadvantage that it is extremely sensitive to the presence of even traces of moisture with which it reacts immediately and vigorously with the liberation of hydrogen chloride which is not only corrosive to the equipment which may ordinarily be used, but also results in the destruction of catalyst. A further disadvantage of aluminum chloride is the essential corrosiveness of this material itself. Still another disadvantage of aluminum chloride as a catalyst in the alkylation of benzene is its excessively high reactivity which causes it to lead to isomerization or disproportionation of the initially formed cumene and of the polyisopropylbenzenes which are always formed as by-products. These products of the isomerization and disproportionation reactions catalyzed by the use of aluminum chloride contaminate the cumene and require more onerous refining procedures, including the necessity for the caustic washing of the liquid and gaseous products of the reaction to remove acidic materials, for example, by-product hydrogen chloride.

In addition to the above-named catalysts, the use of activated clays has been suggested in connection with the alkylation of benzene for motor fuel blend production, as for example in U.S. Patent 2,242,960, and as a support for a solid phosphoric acid catalyst for this purpose, in U.S. Patent 2,018,065. In U.S. Patent 2,115,884, there is described the alkylation of benzene with a catalyst which is an acid washed clay sold commercially under the trademark "Tonsil," made by treating selected clays with a mineral acid and washing out the reaction products. The use of these types of activated clays as disclosed in the prior art has not led to commercially useful results in alkylation processes, in that they produce yields which are not as satisfactory as those obtained, for example, with aluminum chloride, or with sulfuric acid or hydrofluoric acid alkylation catalysts.

In accordance with this invention, I have found that the use of a particular type of acid activated clay as a catalyst in the alkylation of benzene with olefins produces greatly enhanced yields, permits lower operating temperatures, and has numerous other advantages disclosed below. These unexpectedly superior results are obtainable when using acid activated catalyst materials made from relatively pure crystals of the mineral montmorillonite $$(Mg,Ca)O \cdot Al_2O_3 \cdot 5SiO_2 \cdot nH_2O$$

These activated clay catalyst materials are produced by a limited treatment of native clays of the montmorillonite type, for example by heating with a mineral acid such as sulfuric or hydrochloric acid to solubilize certain undesirable components of the clay, followed by distilled or soft water washing, until the product is substantially freed from calcium ions and shows only slight residual acidity, and then followed by treatment with a metal salt solution to precipitate a metal oxide thereon. Thus, a solution of aluminum or magnesium sulfate and ammonia is used to precipitate aluminum oxide or magnesium oxide, or manganese nitrate is used to precipitate manganese oxide, on the clay. Such clays are available commercially, as for example Filtrol Grade 13 (sold by Filtrol Corporation, Vernon, California).

Activated clay catalysts of the type described are white powders, having an analysis, in the case of Filtrol 13, of 72.7% $SiO_2$, 17.0% $Al_2O_3$, 1.4% $Fe_2O_3$, 4.3% $MgO$, 1.6% $CaO$, balance minor impurities. They have a surface area of about 300 sq. m. per gram, a specific gravity of 2.65, a particle density of 1.3, and bulk density of 45 lbs. per cu. ft., and a fineness such that 100% passes through a 100 mesh screen, and 73% through a 325 mesh screen.

These activated clays are non-corrosive and may be used as catalysts for the alkylation of benzene in mild steel vessels, and the alkylation results in the lesser formation of unwanted by-products than when aluminum chloride is used as the alkylation catalyst. Furthermore this activated clay catalyst is not sensitive to moisture, and it can in fact be dehydrated by refluxing with benzene and then azeotropically distilling off any water present as the benzene-water azeotrope below the boiling point of benzene. Thus even the use of propylene containing traces of water which would be quite harmful when aluminum chloride is used as the catalyst is quite harmless when the activated clays above described are used as the catalysts, since such moisture is carried off continuously as the lower boiling benzene-water azeotrope if the reaction is carried out in refluxing benzene as would be customary. While water is not to be considered as a desirable component even in the alkylation of benzene to cumene by the use of the novel catalysts in accordance with my invention, the presence of minor amounts of moisture causes no particular harm, causes no corrosion problems and does not consume or inactivate catalyst.

Furthermore, since the alkylation reaction according to my novel process takes place in liquid phase, this process lends itself readily to continuous operation which is so conducted that a suspension of the novel catalyst in benzene is warmed to gentle refluxing, and both benzene and propylene (or propylene-containing gas) are fed into the mixture continuously, excess gas flows upward through the reflux condenser, and a liquid overflow of product consisting of benzene containing cumene and polyisopropylbenzenes is drawn off at such a rate that the activated clay catalyst is not carried over with the liquid overflow. The gaseous stream escaping from the reflux condenser will be saturated with benzene and other liquid components at the temperature of the exiting gas stream and the content of liquid components, can, if desired be stripped out from such exiting gases by a conventional absorber system and recovered for recycle to the alkylation unit or for other uses. The overflow or product stream necessarily present in the continuous alkylation process can be regulated with respect to the diameter and height of the alkylating unit so that the upward velocity of the liquid in which the catalyst is suspended will be less than the rate of settling of the suspended activated clay catalyst. I have found that at the beginning of a continuous operation the velocity of overflow from the continuous alkylating unit can be so adjusted that only a small amount at most of catalyst is carried over, representing the finest particles, but once these finest particles are removed, only a lesser or negligible carry-over of catalyst occurs, indicating that decrease in particle size of the catalyst during the catalytic alkylation process does not occur.

The overflow from the continuous alkylation process passes to an intermediate storage tank, which in large scale operation is preferably heat insulated to retain the sensible heat of the liquid, and from there passes by means of a pump or other device to a continuous stripping column in which unreacted benzene is stripped from the liquid product for recycle to the alkylation unit, while the benzene-free bottoms from this column is transferred to a second column for separation into cumene as an overhead distillate and a bottoms product of polyisopropylbenzenes. The stripping of the benzene from the crude alkylation product is so conducted that the residue is completely free of benzene, although the benzene may contain some cumene, which is of course not lost since the benzene containing some cumene is recycled to the alkylation unit for further processing. The product from the continuous catalytic alkylation unit may be separated into benzene, cumene, and polyisopropylbenzenes in a batch still, but it is more efficient to use a continuous fractionation system.

The polyisopropylbenzene fraction may be dealkylated to cumene by the use of the same catalyst at higher temperatures, as will be described in an example, or it may be utilized or sold for other purposes. It may be further fractionated into separate components such as mixed or individual diisopropylbenzenes which are suitable raw materials for oxidation to mixed phthalic acids or to the individual phthalic acids.

The preferred temperature of operation of the alkylation is in the range of about 65 to 85° C., within which range I have found that a rise in temperature of about 10° C. approximately doubles the rate of alkylation, which is thus approximately twice as rapid at 75° C. as at 65° C., and at vigorous refluxing after the steady state has been reached, which is then at about 85° C., the reaction velocity is about twice as high as at 75° C.

It is preferred in the operation of my process to use a considerable molar excess of benzene over propylene, such excess serving to limit the amount of polyisopropylbenzenes formed. I have found a suitable ratio of benzene to propylene to be 5 moles of benzene to 1 mole of propylene, but naturally larger or smaller molar ratios of benzene to propylene may be used, the higher ratios of benzene to propylene leading to lower ratios of polyisopropylbenzenes to cumene, and lower ratios of benzene to propylene leading to higher ratios of polyisopropylbenzenes to cumene. In general the optimum ratio of benzene to propylene is based on economic considerations such as the cost in heat units to vaporize the excess benzene in the product to produce recycle benzene as compared to the cost of dealkylating polyisopropylbenzenes to cumene. I have found that the molar ratio of benzene to propylene is most economical within the range of 2.5:1 to 7:1, with a ratio of 5:1 representing the best overall economy.

The dealkylation of the polyisopropylbenzenes can be successfully carried out over the same catalyst (the alkylation catalyst) but at higher temperatures preferably at above 100° C. The polyisopropylbenzenes as obtained in the distillation to yield pure cumene ordinarily contain 30–50% of cumene, the fractionation being so conducted as to assure the purity of the cumene product by leaving cumene in the bottoms and thus avoiding any polyisopropylbenzene in the pure cumene overhead distillate. The crude polyisopropylbenzene fraction containing cumene may be dealkylated either as such or on dilution with benzene. The dealkylation is a slower reaction than the alkylation when using the identical type of catalyst as in the alkylation, and can be carried out either batchwise or continuously, a batch process being rather more convenient because of the smaller volumes involved. The product of the dealkylation may be added to the stream going to the primary stripping column for the separation of the products of the alkylation process, preferably as a continuous stream, or may be separately fractionated into a benzene fraction, a cumene fraction, and a new but smaller polyisopropylbenzene fraction, as will be obvious to those skilled in the art.

The following examples illustrate, but do not limit, the invention:

*Example 1*

100 grams of activated clay (Filtrol Grade 13) was dried by refluxing with 2 liters of benzene, in a 5-liter flask and then distilling off 500 ml. of benzene which carried over a small amount of water. By the time 300 ml. of benzene had been distilled off the distillate was clear and free of traces of moisture. The anhydrous slurry was then diluted with 1500 ml. of dry nitration grade benzene to give 3 liters of a benzene suspension containing 100 grams (less the water content) of activated clay. The whole charge in the 5-liter flask was set in a water bath. The flask had an inlet tube dipping down into the liquid as far as possible, a mercury sealed stirrer, a reflux condenser, with a trap below the condenser return tube to hold back any water distilled over, and a thermometer. The water bath was heated to 90° C. Propylene (C.P. grade, not less than 99% propylene content) dried by passage through a Drierite tube was fed in slowly through the gas inlet tube. In the course of 2 hours 100 grams of propylene was fed in at a uniform rate and consumption of propylene gradually increased as evidenced by the apparently decreasing size of the gas bubbles, after which the rate of absorption seemed to be constant. An additional 250 grams of propylene was fed in at the rate of 50 grams per hour, when the propylene feed was discontinued and the charge heated for an additional hour. The charge was then cooled to room temperature, the solution was decanted through a filter, avoiding as much as possible getting any solid on the filter, and the residual slurry was shaken up with 200 ml. of fresh dry benzene, which after settling was also decanted to the filter. The total filtered liquid was distilled from a two-liter flask with a fractionating head, up to 125° C., adding fresh liquid to be distilled as the benzene was distilled off, until the entire charge had been distilled to 125° C. as measured in the vapor stream. The residue was approximately 1200 ml. This was then distilled slowly to give a high reflux ratio during the distillation. There was collected to 150° C. a forerun of 135 grams of benzene containing some cumene, a middle fraction from 150–170° C. of 625 grams, which was almost pure cumene, and a residue of 305 grams in the flask which was principally polyisopropylbenzenes containing some cumene.

A kilo of this residue fraction collected from a number of runs was dealkylated by heating for 8 hours under reflux (initially very slight refluxing) at 120° C. with 100 grams of catalyst prepared as above for the alkylation process. After an hour there was a slight but increasing reflux and considerable evolution of gases. The gas was bubbled through water in which it was somewhat soluble, and the water solution of the gas decolorized bromine water very rapidly, indicating the presence of propylene. The residual liquid was then distilled, yielding to 160° C. 590 grams of crude cumene containing some benzene and 230 grams of residue above 160° C. consisting largely of polyisopropylbenzenes. The loss of 180 grams was largely due to the formation and escape as gas of propylene resulting from the dealkylation of the polyisopropylbenzenes.

*Example 2*

This was run similarly to Example 1, except that the gas used to alkylate the benzene was a propane-propylene mixture, with propane and propylene present in equal amounts by weight, and containing a total of about 2% of ethane and isobutane, and about 0.3% of ethylene. Furthermore, weighed strips of sheet steel which had been carefully cleaned with fine sandpaper were suspended by platinum wires in both the liquid space and the vapor space of the flask. After the run was completed these strips were found not to have changed in appearance nor in weight indicating that no corrosion occurs during the alkylation process using activated clay as catalyst. 700 grams of the mixed propane-propylene gas was fed into the alkylation flask beneath the liquid surface as in Example 1, in the course of 14 hours at an approximate rate of 50 grams per hour. After all the gas was added, the charge was heated for an additional hour at 85° C., and then separated by fractionation as in Example 1. The fore-run in the cumene distillation, 125 to 150° C. was 120 grams of benzene containing some cumene, the fraction 150–160° C. was 590 grams, and there was a residue of 295 grams in the flask. A sample of the escaping gas from the condenser was tested for unsaturation by treatment with sulfuric acid, and was found to contain 9% unsaturates (propylene) and 91% unabsorbed material which had a gas density approximately corresponding to propane. The yields of liquid products were slightly lower than in Example 1, but for the crude methods of evaluation used may be considered as substantially equivalent. Repeated refractionation of the kilo of the 125–150° C. fraction from several runs to isolate the 125–145° fraction failed to give any indication of the presence of ethylbenzene, although several tenths of a per cent of ethylene was known to be present in the gas used for alkylation, and from the analysis of the gas (ca. 0.3% ethylene), the amount of ethylbenzene which would be present in the kilo of 125–150° C. fraction, if formed quantitatively should have been about 65 grams, and would have been easily detectable. This indicates the catalyst under these conditions is not effective for the alkylation of benzene by ethylene, and is selective for the alkylation of benzene by propylene.

*Example 3*

A continuous alkylator was constructed of a 24-inch length of 4-inch standard carbon steel pipe to which was welded a conical bottom 8 inches in height. Six inches below the top of the cylindrical main section a one-inch nozzle was welded to serve as an overflow and as a conduit to the intermediate product storage. The top of the 4-inch pipe was threaded to take a screw cap with openings for a liquid feed line, a gas feed line, a reflux condenser and a thermometer. The gas and liquid feed lines were ¼ inch stainless steel tubes carried as close to the bottom as possible (within 1 inch of the bottom of the cone). The gas inlet line was tapered at its bottom outlet end to provide a jet effect for the gas fed through it into the liquid charge. The unit was set in a 24-inch long section of 10-inch pipe closed by a flange at the bottom and open at the top. The section of 10-inch pipe served as a water bath and it was heated by a variable resistance electrical immersion heater to give the required temperature. The 10-inch pipe was insulated as completely as possible by magnesia insulation. To start the run the reaction vessel was loaded with fresh benzene (about 4 liters) and the water bath was heated to 85° C. to bring about gentle refluxing. No catalyst was added then benzene was fed in at the rate of 500 ml. per hour, which gave an upward linear flow rate of liquid of about 1 mm. per minute, which was low enough to permit the catalyst when used to settle out, as the settling rate of a slurry of the catalyst was at the rate of about 10 mm. per minute. The unit was run for 6 hours without any catalyst to cleanse the system of possible accelerators or inhibitors of the catalysis, and then a suspension of dry catalyst in dry benzene was added to the benzene feed line until 200 grams of catalyst had been added. Simultaneously with the addition of the catalyst slurry dry propylene was bubbled in at the rate of 45–50 grams per hour. This gave a molar ratio of benzene to propylene of approximately 5:1, and an average residence time for the benzene of 8 hours. Some of the catalyst settled into the tip of the cone below the gas and liquid inlets, but by making sure that the gas flow was continuous after the catalyst feed was started plugging was avoided. Only small amounts of catalyst were mechanically carried over, estimated to be about 1–2 grams per hour, so that in long runs the catalyst was replenished at the rate of 20 grams per day by feeding in a slurry of catalyst in benzene at intervals. The feed of benzene was 12 liters per 24-hour day, and the yield about 16.5 liters. The yield from the blend of a 4-days run was based on the careful analysis of a measured aliquot:

34.40 kilos benzene
7.73 kilos cumene
2.14 kilos polyisopropylbenzene with an average of 2.2 isopropyl groups per benzene nucleus.

Thus of the original 41.76 kilos of benzene supplied there were recovered 34.40 kilos, leaving 7.36 kilos consumed. The 7.73 kilos of cumene correspond to 5.19 kilos of benzene, and the 2.14 kilos of polyisopropylbenzene, correspond to 0.96 kilo of benzene, or a total of 6.15 kilos of benzene in the cumene and isopropylbenzenes leaving 1.21 kilos of benzene unaccounted for in the liquid product, and representing vapor losses of benzene in the exit gases and other losses. The benzene in the vapors can be recovered by known absorption methods, and the 2.14 kilos of polyisopropylbenzene can be converted to cumene by dealkylation, as indicated in Example 1.

I claim:

1. Method for the alkylation of benzene which comprises reacting benzene with an olefin in the liquid phase at substantially atmospheric pressure at a temperature between about 65° and 85° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

2. Method for the production of cumene which comprises reacting benzene in the liquid phase at substantially atmospheric pressure with propylene at a temperature between about 65° and 85° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

3. Method for the production of cumene which comprises reacting from about 2.5 to 7.5 moles of benzene with 1 mole of propylene, in the liquid phase at substantially atmospheric pressure at a temperature between about 65° and 85° C., in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

4. Method for the production of cumene which comprises reacting about 5 moles of benzene with 1 mole of propylene, in the liquid phase at substantially atmospheric pressure, at a temperature between about 65° and 85° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

5. Method for the production of cumene which comprises reacting benzene in the liquid phase with propylene at substantially atmospheric pressure at a temperature between about 65° and 85° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon, separating the cumene by distillation from polyisopropylbenzene formed during the alkylation, and converting the polyisopropylbenzene to cumene by heating it at a temperature between about 100° and 120° C. in the presence of said alkylation catalyst.

6. Method for the monoalkylation of benzene which comprises reacting benzene in the liquid phase with an olefin at substantially atmospheric pressure at a temperature between about 65° and 85° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon, separating by distillation the monoalkylbenzenes obtained from polyalkylbenzenes formed during the alkylation, and converting the polyalkylbenzenes to monoalkylbenzenes by heating them at a temperature between about 100° and 120° C. in the presence of said alkylation catalyst.

7. Method for the conversion of polyalkylbenzenes to monoalkylbenzenes which comprises heating said polyalkylbenzene at a temperature between about 100° and 120° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

8. Method for the conversion of polyisopropylbenzene to cumene which comprises heating the polyisopropylbenzene at a temperature between about 100° and 120° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

References Cited in the file of this patent

UNITED STATES PATENTS

| | | |
|---|---|---|
| 2,395,198 | Schulze et al. | Feb. 19, 1946 |
| 2,564,488 | Mahan | Aug. 14, 1951 |
| 2,574,895 | Stecker | Nov. 13, 1951 |
| 2,660,572 | Feasley | Nov. 24, 1953 |

FOREIGN PATENTS

| | | |
|---|---|---|
| 316,961 | Great Britain | Nov. 6, 1930 |